United States Patent
Matsugashita

(10) Patent No.: US 9,027,107 B2
(45) Date of Patent: May 5, 2015

(54) INFORMATION PROCESSING SYSTEM, CONTROL METHOD THEREOF, AND STORAGE MEDIUM THEREOF

(71) Applicant: Canon Kabushiki Kaisha, Tokyo (JP)

(72) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 13/898,166

(22) Filed: May 20, 2013

(65) Prior Publication Data

US 2013/0318590 A1 Nov. 28, 2013

(30) Foreign Application Priority Data

May 22, 2012 (JP) ................. 2012-116625

(51) Int. Cl.
H04L 29/06 (2006.01)
(52) U.S. Cl.
CPC .................... H04L 63/0815 (2013.01)
(58) Field of Classification Search
CPC .................................................. H04L 63/0815
USPC ............................................. 726/8, 6, 28, 16
See application file for complete search history.

(56) References Cited

U.S. PATENT DOCUMENTS

| | | | | |
|---|---|---|---|---|
| 6,731,731 | B1 * | 5/2004 | Ueshima ...................... | 379/196 |
| 8,572,710 | B2 * | 10/2013 | Narayanan et al. ................ | 726/9 |
| 2003/0046391 | A1 * | 3/2003 | Moreh et al. ................... | 709/225 |
| 2005/0277420 | A1 * | 12/2005 | Shin et al. ...................... | 455/442 |
| 2006/0053296 | A1 * | 3/2006 | Busboom et al. ............. | 713/182 |
| 2006/0206709 | A1 * | 9/2006 | Labrou et al. .................. | 713/167 |
| 2006/0233166 | A1 * | 10/2006 | Bou-Diab et al. ............. | 370/389 |
| 2006/0294051 | A1 * | 12/2006 | Kapadia et al. ..................... | 707/1 |
| 2006/0294578 | A1 * | 12/2006 | Burke et al. ....................... | 726/2 |
| 2007/0079384 | A1 * | 4/2007 | Grinstein .......................... | 726/27 |
| 2007/0192352 | A1 * | 8/2007 | Levy ............................. | 707/102 |
| 2007/0234422 | A1 * | 10/2007 | Piesing .............................. | 726/19 |
| 2008/0114791 | A1 * | 5/2008 | Takatsu et al. ................ | 707/100 |
| 2008/0172725 | A1 * | 7/2008 | Fujii et al. .......................... | 726/5 |
| 2009/0119759 | A1 * | 5/2009 | Taugbol ............................ | 726/6 |
| 2009/0119763 | A1 * | 5/2009 | Park et al. ......................... | 726/8 |
| 2009/0292767 | A1 * | 11/2009 | Wen ............................... | 709/203 |
| 2011/0040944 | A1 * | 2/2011 | Yamauchi et al. ............. | 711/163 |
| 2011/0067086 | A1 * | 3/2011 | Nachenberg et al. ............. | 726/2 |
| 2011/0202502 | A1 * | 8/2011 | Takatsu et al. ................ | 707/608 |
| 2011/0231921 | A1 * | 9/2011 | Narayanan et al. ................ | 726/9 |
| 2012/0117612 | A1 * | 5/2012 | Grinstein ........................... | 726/1 |
| 2012/0278872 | A1 * | 11/2012 | Woelfel et al. .................... | 726/7 |

(Continued)

FOREIGN PATENT DOCUMENTS

JP 2009-118110 A 5/2009

Primary Examiner — David Garcia Cervetti
(74) Attorney, Agent, or Firm — Canon U.S.A., Inc. IP Division

(57) ABSTRACT

A method for realizing Single Sign-On (SSO) includes verifying, using prior information, whether authorization information issued by a first information processing system in response to successfully authenticating a user satisfies security requirements, providing, in a case where the authorization information is verified as satisfying the security requirements, a service without performing the user authentication, and performing, if an instruction to register a first information processing system that performs user authentication is received from the user, the registration by a method different from a method according to a management method of the prior information in the first information processing system.

13 Claims, 12 Drawing Sheets

(56) References Cited

U.S. PATENT DOCUMENTS

| | | | |
|---|---|---|---|
| 2013/0024923 A1* | 1/2013 | Wallaja | 726/6 |
| 2013/0073844 A1* | 3/2013 | Shimada | 713/156 |
| 2013/0247142 A1* | 9/2013 | Nishizawa et al. | 726/1 |
| 2013/0254840 A1* | 9/2013 | Islam et al. | 726/3 |
| 2013/0254852 A1* | 9/2013 | Islam et al. | 726/4 |

* cited by examiner

FIG.5

USER TABLE (50)

| USER ID (501) | PASSWORD (502) | TENANT ID (503) |
|---|---|---|
| user01@a.com | ********* | TA00000001 |
| user02@a.com | ********* | TA00000001 |
| userxx@b.co.jp | ******* | TA00000002 |
| useryy@b.co.jp | ******* | TA00000002 |
| .... | .... | .... |

TENANT TABLE (51)

| TENANT ID (511) | SELECTED ID PROVIDER TYPE (512) | SELECTED ID PROVIDER ENTITY ID (513) |
|---|---|---|
| TA00000001 | ID PROVIDER A | https://tenantA.providerA.com/ |
| TA00000001 | ID PROVIDER B | https://providerB.com/ |
| .... | .... | .... |

ID PROVIDER MASTER TABLE (52)

| ID PROVIDER TYPE (521) | METADATA/CERTIFICATE UPLOAD NECESSARY (522) | ENTITY ID SHARABLE (523) | SHARED ENTITY ID (524) |
|---|---|---|---|
| LOGIN APPLICATION | — | — | — |
| ID PROVIDER A | YES | NO | — |
| ID PROVIDER B | NO | YES | https://providerB.com/ |
| .... | .... | .... | .... |

ID PROVIDER MANAGEMENT TABLE (53)

| TENANT ID (531) | ENTITY ID (532) | ID PROVIDER TYPE (533) | ID PROVIDER STATUS (534) |
|---|---|---|---|
| TA00000001 | https://tenantA.providerA.com/ | ID PROVIDER A | REGISTERED |
| TA00000001 | https://providerB.com/ | ID PROVIDER B | REGISTERED |
| TA00000002 | https://providerB.com/ | ID PROVIDER B | REGISTERED |
| .... | .... | .... | .... |

USER MAP TABLE (54)

| ENTITY ID (541) | USER ID (542) | MAPPING ID (543) |
|---|---|---|
| https://tenantA.providerA.com/ | user01@a.com | user01@tenantA.provA.com |
| https://tenantA.providerA.com/ | user02@a.com | user02@tenantA.provA.com |
| https://providerB.com/ | user01@a.com | user01@provB.com |
| https://providerB.com/ | user02@a.com | user02@provB.com |
| https://providerB.com/ | userxx@b.co.jp | userxx@provB.com |
| https://providerB.com/ | useryy@b.co.jp | useryy@provB.com |
| .... | .... | .... |

FIG.6

```
SAML 2.0 METADATA SAMPLE
<? xml version="1.0" encoding="UTF-8"?>
<md:EntityDescriptor xmlns:md="urn:oasis:names:tc:SAML:2.0:metadata" entityID ="[Entity ID]">
<md:IDPSSODescriptor protocolSupportEnumeration="urn:oasis:names:tc:SAML:2.0:protocol">
<md:KeyDescriptor use="signing">
  <ds :KeyInfo xmlns:ds="http://www. w3.org/2000/09/xmldsig#" >
    <ds:X 509Data><ds:X 509Certificate>[SIGNING USING CERTIFICATE]</ds :X509Certificate></ds :X509Data>
  </ds:KeyInfo>
</md:KeyDescriptor>
<md:NameIDFormat>[NameID FORMAT]</md:NameIDFormat>
<md:SingleSignOnService Location="[SAML POST URL]" Binding="urn:oasis:names:tc:SAML:2.0:bindings: HTTP-POST"/>
<md:SingleSignOnService Location="[SAML Redirect URL]" Binding="urn:oasis:names:tc:SAML:2.0:bindings:HTTP-Redirect"/>
</md:IDPSSODescriptor>
</md:EntityDescriptor>
```

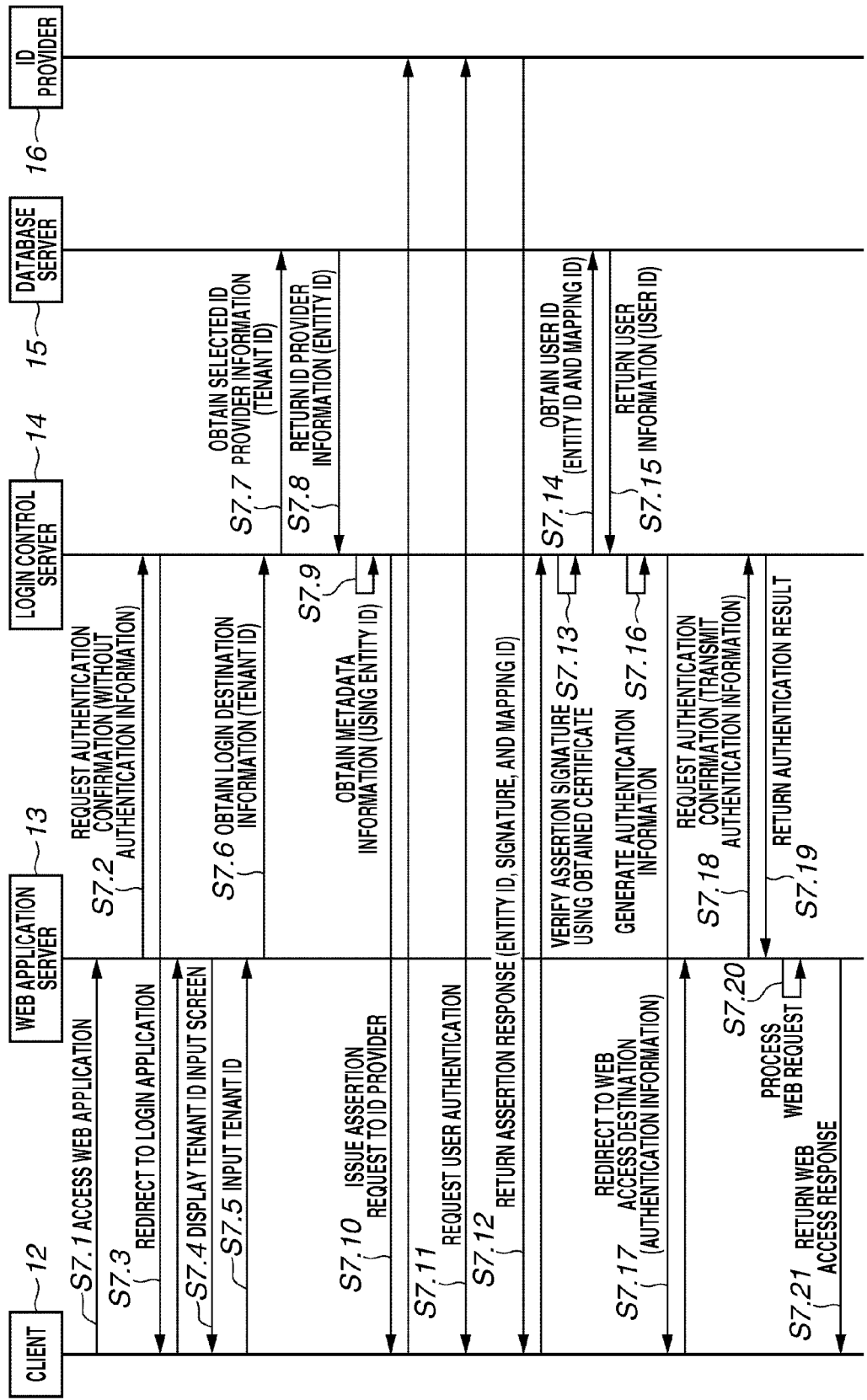

FIG.9B
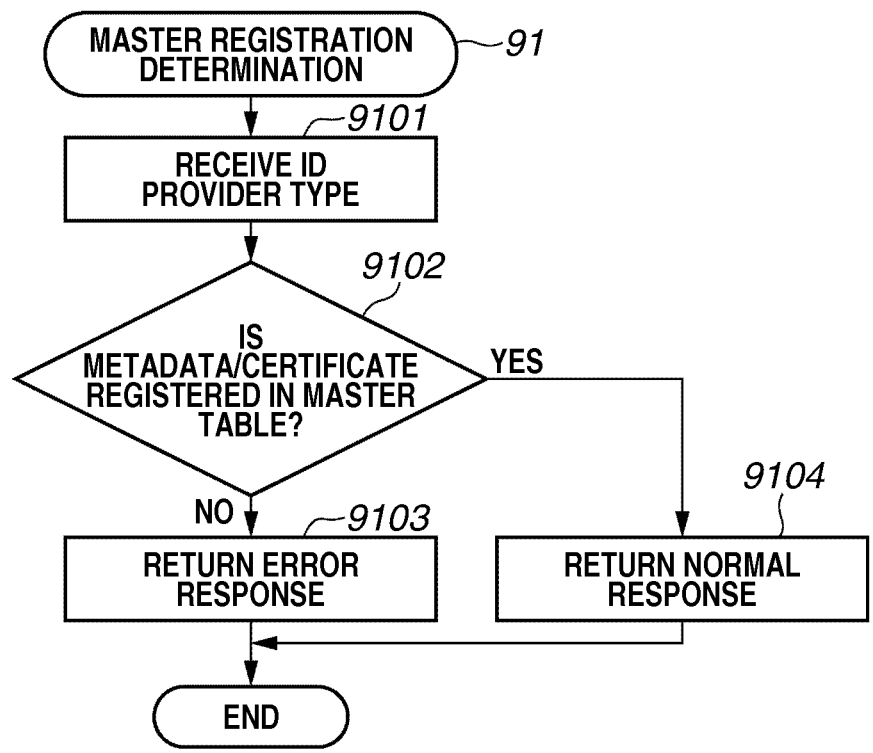
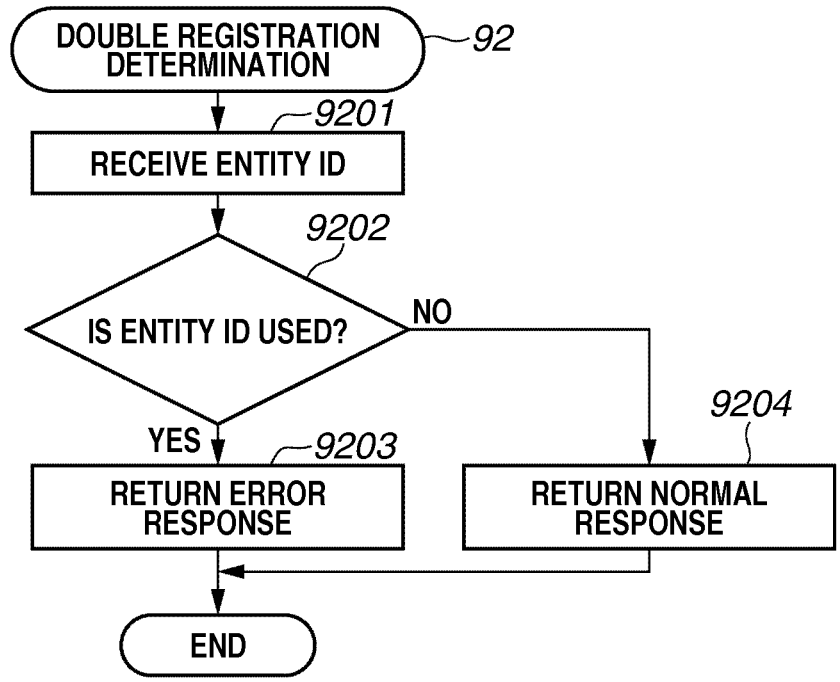

INFORMATION PROCESSING SYSTEM, CONTROL METHOD THEREOF, AND STORAGE MEDIUM THEREOF

BACKGROUND

1. Field

Aspects of the present invention generally relate to an information processing system for realizing Single Sign-On (SSO) between different domains, a control method thereof, and a storage medium thereof.

2. Description of the Related Art

Conventionally, SSO using Security Assertion Markup Language (SAML) is known as a technique for causing authentication to be federated between a plurality of servers existing under different domains.

The SAML-based SSO is realized by an information processing system (i.e., an identity (ID) provider) including a server that requests a user to input authentication information and performs authentication based on the input authentication information and an information processing system (i.e., a service provider) including a server that trusts an authentication result of the ID provider and thus provides services without performing authentication based on the authentication information. If the user is to receive a service from the service provider, the user is required to access the ID provider and be authenticated. For example, the user is authenticated by the ID provider based on user authentication information such as a user ID and a password managed by the ID provider.

The ID provider then issues to the service provider an assertion which is a certificate of authentication. The service provider authenticates the user by verifying whether the assertion has been issued by a reliable ID provider. The user can thus be authenticated by the service provider based on the verification result without inputting the authentication information managed by the service provider, and receive the service from the service provider.

As described above, the SAML-based SSO depends on a trust relationship between the ID provider and the service provider. Therefore, it is necessary for a trust relationship to be previously established between the ID provider and the service provider before realizing SSO. Such a trust relationship is established by exchanging metadata describing the function for performing the SSO among a plurality of functions in the SAML, and an electronic certificate certifying that the assertion has been issued from the ID provider. The specific content of the metadata and the technique for establishing the trust relationship are defined in SAML V2.0, i.e., a standard technology. The metadata and the information necessary for verifying the assertion, such as the electronic certificate, will be referred to as prior information. The service provider uses the prior information to verify whether the assertion satisfies the requirements. The prior information is data generally issued by the ID provider.

In SAML, whether such ID provider is a reliable ID provider as viewed from the service provider is verified in addition to verifying whether the user has been authenticated by the ID provider, so that the secure SSO can be realized. Reliability of the ID provider is actually determined by the service provider verifying, using an electronic certificate in which a signature in the assertion issued by the ID provider is preset.

The SSO is advantageous in reducing the number of user authentication to be performed. However, there are issues in realizing SSO as follows. For example, if there is an error in associating a user of the ID provider with a user of the service provider in setting the SAML, the user authenticated by the ID provider is authenticated by the service provider as a different user instead of the actual user. The user is thus authenticated as a different user of the service provider and receives the functional service of the service provider. Since the authenticated user does not receive the service as the actual user managed by the service provider, it is disadvantageous for both the service provider and the user. In other words, it is necessary to correctly and securely establish the trust relationship to safely use the SAML mechanism.

Conventionally, Japanese Patent Application Laid-Open No. 2009-118110 discusses a method for setting a trust relationship between an ID provider and a service provider. More specifically, Japanese Patent Application Laid-Open No. 2009-118110 discusses a technique related to SSO for securely establishing the trust relationship between a dynamically-arranged device and a service providing server. When establishing the trust relationship, the service providing server causes a certificate authority to verify the signature in the metadata, so that secure SSO is realized while dynamically registering the metadata.

The trust relationship for realizing the SSO can be dynamically established using the technique discussed in Japanese Patent Application Laid-Open No. 2009-118110. However, since the technique discussed in Japanese Patent Application Laid-Open No. 2009-118110 is only for establishing the trust relationship with respect to the service providing server, i.e., the ID provider, and does not consider establishing the trust relationship with respect to the service provider. In particular, since it is assumed that a plurality of ID providers, each of which manages the prior information differently, and the service provider are to realize the SSO federation in the future, it is desirable to establish an appropriate service provider.

SUMMARY OF THE INVENTION

Aspects of the present invention generally related to establishing a service provider, assuming that a plurality of ID providers, each of which manages prior information differently, and the service provider are to realize SSO federation.

According to an aspect of the present invention, a second information processing system that communicates with a first information processing system that performs user authentication using user authentication information input by a user includes a verification unit configured to, using prior information, verify whether authorization information issued by the first information processing system in response to successfully authenticating a user satisfies security requirements, a providing unit configured to, in a case where the authorization information satisfies the security requirements, provide a service without performing the user authentication, and a registration unit configured to, if an instruction to register a first information processing system that performs user authentication is received from the user, perform the registration by a method different from a method according to a management method of the prior information in the first information processing system.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates a table structure of a database server.

FIG. 6 illustrates a sample of metadata.

FIG. 7 is a sequence diagram illustrating Single Sign-On.

FIGS. 9A and 9B are flowcharts illustrating an ID provider registration process.

DESCRIPTION OF THE EMBODIMENTS

Figure 1:
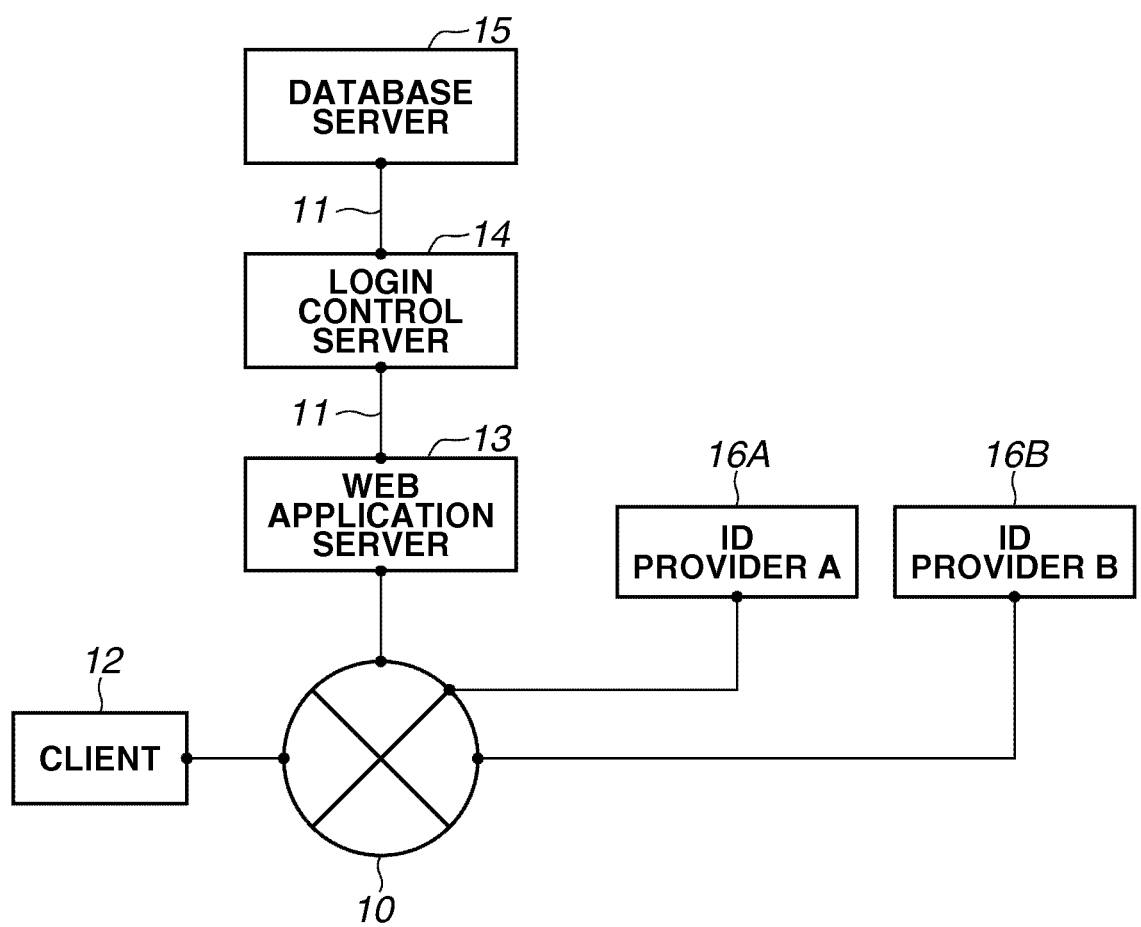
FIG. 1 illustrates a system configuration.

Various exemplary embodiments, features, and aspects of the invention will be described in detail below with reference to the drawings.

A service provider according to an exemplary embodiment will be described below.

According to the present exemplary embodiment, the service provider supports multi-tenants, and manages data for each tenant. The service provider thus also manages prior information for each tenant. The tenant indicates a specific group, such as a company or an organization which has received services using a conventional dedicated server. A multi-tenant-based information processing system includes a partition function that logically divides data pieces for managing the information pieces of a plurality of tenants in one hard disk drive (HDD). Thus, the data pieces of the plurality of tenants coexists in the same HDD.

A relation between an ID provider and a service provider according to the present exemplary embodiment will be described below.

From a view point of the service provider, the ID provider is identified based on an ID referred to as an Entity ID. The Entity ID is written in the above-described metadata which has been previously exchanged, and the ID provider can be identified by referring to the Entity ID written in the metadata. According to the present exemplary embodiment, the ID providers are different from each other in configurations of servers which provide the authentication function within the ID provider. The first server providing the authentication function has only a single Entity ID, and the second server is capable of having a plurality of Entity IDs. Whether the server has a single Entity ID or a plurality of Entity IDs depends on the ID provider. If the server has a plurality of Entity IDs, there is a plurality of ID providers corresponding to one server instead of a one-to-one relation. The term "ID provider" which identifies the server thus does not indicate one server. The difference in the assignment of the Entity ID between each of the ID providers will be described below.

For example, since SAML is realized by hypertext transfer protocol (HTTP), the ID provider that becomes an endpoint is defined by a uniform resource locator (URL). In addition, a different electronic certificate is required for each Entity ID to sign the assertion. However, the electronic certificate is issued associated with a host name. As a result, if the ID provider is to have a plurality of Entity IDs, it is necessary for each Entity ID to have a different host name and to be capable to solve internet protocol (IP) addresses of the respective host names. If the ID provider is to dynamically add an Entity ID in response to a request from the user, it is necessary for the ID provider to include a domain name system (DNS) server and to register in the DNS server the new host name and IP address in response to addition of the Entity ID. Therefore, it is difficult for the ID provider to have a plurality of Entity IDs unless the ID provider is comparatively large-scale. However, since the Entity ID can be changed for each tenant, a more secure SSO can be realized.

On the other hand, in a case where the service is provided to a third party such as an application service provider (ASP), user-friendliness and security can be improved by restricting access from the third party to a specific URL. In such a case, there is only one URL and one Entity ID.

One specific issue according to the present exemplary embodiment will be described in detail below. Conventionally, it is not assumed that a server which is a service provider has a multi-tenant configuration to be used by a plurality of organizations. Thus, the following issue needs to be considered. If the service provider has the multi-tenant configuration, it is necessary to establish a trust relationship between the ID provider for each tenant. However, in the case where the server providing an authentication function as the ID provider has only a single Entity ID, the plurality of tenants shares one Entity ID. Therefore, if the setting of the trust relationship between the service provider and the ID provider is dynamically changed, the trust relationship set with the other tenants become invalid.

Further, there are other issues. If the server providing the authentication function as the ID provider is capable of having a plurality of Entity IDs, it is necessary to dynamically establish a trust relationship between the ID provider for each tenant to satisfy security requirements. In such a case, if a specific tenant has previously established the trust relationship with the ID provider, and the ID provider then newly establishes a trust relationship with another tenant, an indirect trust relationship may be established between a plurality of unrelated tenants. There is thus a risk of unintended SSO becoming realized.

As described above, there are issues to be solved in the case where the service provider which has the multi-tenant configuration for managing data for each tenant is to realize the SSO federation with a plurality of ID providers whose management methods of the prior information are different.

The definitions of terms to be used according to the present exemplary embodiment will be described below.

User authentication indicates authentication using user authentication information input by a user. The information processing system which performs the user authentication provides an authentication screen in response to an access from a user who has not yet been authenticated. The information processing system then receives the user authentication information input via the authentication screen, and verifies whether the user is a normal user based on the received user authentication information. According to the present exemplary embodiment, the information processing system corresponding to the ID provider and the information system corresponding to the service provider both include a function of performing the user authentication. However, since the service provider trusts the result of the authentication performed by the ID provider, the service provider provides the services without performing the user authentication. This is the advantage of the SSO, in particular SAML with respect to the user.

The information processing system refers to a system that includes at least one login control server that performs user authentication and a server that provides services according to a successful user authentication performed by the login control server. However, these servers may be integrated as one server, so that when referring to the information processing system, it is not necessarily configured of a plurality of servers. Further, the information processing system may be configured of only the login control server.

Authorization information is data issued according to a successful user authentication performed by the ID provider, and corresponds to an assertion in the SAML. According to the present exemplary embodiment, the authorization information is synonymous to assertion. However, a form of the authorization information is not necessarily limited to an assertion format defined by the SAML. The authorization information thus refers to data that is used by the service provider to trust the authentication result of the ID provider, and is data that is more broadly defined as compared to an assertion.

As described above, metadata and an electronic certificate to be used in verification of whether the authorization information satisfies the requirements are referred to as prior information. However, the prior information for implementing the present exemplary embodiment is not limited to the metadata and the electronic certificate, and may include other information to be used in verification of the authorization information. Further, according to the present exemplary embodiment, the prior information may indicate either one of the metadata or the electronic certificate. In other words, the prior information is thus the information required to be previously registered for verifying whether the authorization information satisfies the requirements.

According to the present exemplary embodiment, the metadata at least includes the Entity ID for identifying the ID provider. The service provider verifies, when verifying the authorization information, whether the authorization information is issued from a reliable ID provider by comparing the Entity ID written in the metadata and the Entity ID of the authorization information. Further, the metadata may include a description defining whether the ID provider or the service provider is to perform mapping of the user of the ID provider and the user of the service provider.

According to the present exemplary embodiment, the electronic certificate or the certificate includes a public key corresponding to the ID provider, and a hash. The signature included in the authorization information or the signature transmitted as different data along with the authorization information includes a hash which has been encrypted by a symmetric key corresponding to the public key. The service provider verifies, when verifying the authorization information, whether the authorization information is issued by a normal ID provider, using the electronic certificate and the signature. The verification uses a general electronic certificate technique.

The service provider performs at least one of the above-described methods for verifying the authorization information. If the service provider verifies that the authorization information has been issued from the normal ID provider, it is referred that the authorization information satisfies the requirements. As described above, the prior information is the data used for verifying whether the authorization information satisfies the requirements.

FIG. 1 is a block diagram illustrating the system configuration according to a first exemplary embodiment.

Referring to FIG. 1, a wide area network (WAN) 10 configures a world wide web (WWW) system according to the present exemplary embodiment. A local area network (LAN) 11 connects each of components.

A client 12 is at least one or more client computers that issue via the WAN 10 a web access request to a web application server 13 and an ID provider 16 to be described below. More specifically, the client 12 is a client computer that includes a web browser for using the WWW system, and is operated by a user. The client 12 is blocked communication other than issuing of a request to the WAN 10 by a firewall device (not illustrated). Each device is communicable with each other using the above-described network resources.

The web application server 13 performs processing according to a web access request from the client 12 and responds to the client 12 via the WAN 10 and the LAN 11. The web application server 13 communicates with a server, i.e., the ID provider 16 to be described below, via the web browser in the client 12. There may be one or more ID providers 16. The ID provider 16 is thus referred to as an information processing system.

A login control server 14 receives the authentication and an authentication setting request from the web application server 13 via the LAN 11, and communicates with a database server 15 described below to perform user authentication.

The database server 15 receives a data access request from the login control server 14 via the LAN 11. The database server 15 includes a general database management system (DBMS). The information processing system including the web application server 13, the login control server 14, and the database server 15 corresponds to a second information processing system.

The ID providers 16A and 16B are one or more ID providers that receive a login request from the client 12 via the WAN 10 and perform user authentication. Further, the ID providers 16A and 16B receive an SSO request from the login control server 14 via the web browser in the client 12 and the web application server 13 according to a SSO flow to be described below. According to the present exemplary embodiment, the ID provider 16 includes an SAML ID provider function. Further, one of the information processing systems, i.e., the ID provider 16A or 16B, corresponds to a first information processing system. According to the present exemplary embodiment, description is made based on the premise that there are two ID providers. In another exemplary embodiment, two or more ID providers can be federated.

Figure 2:
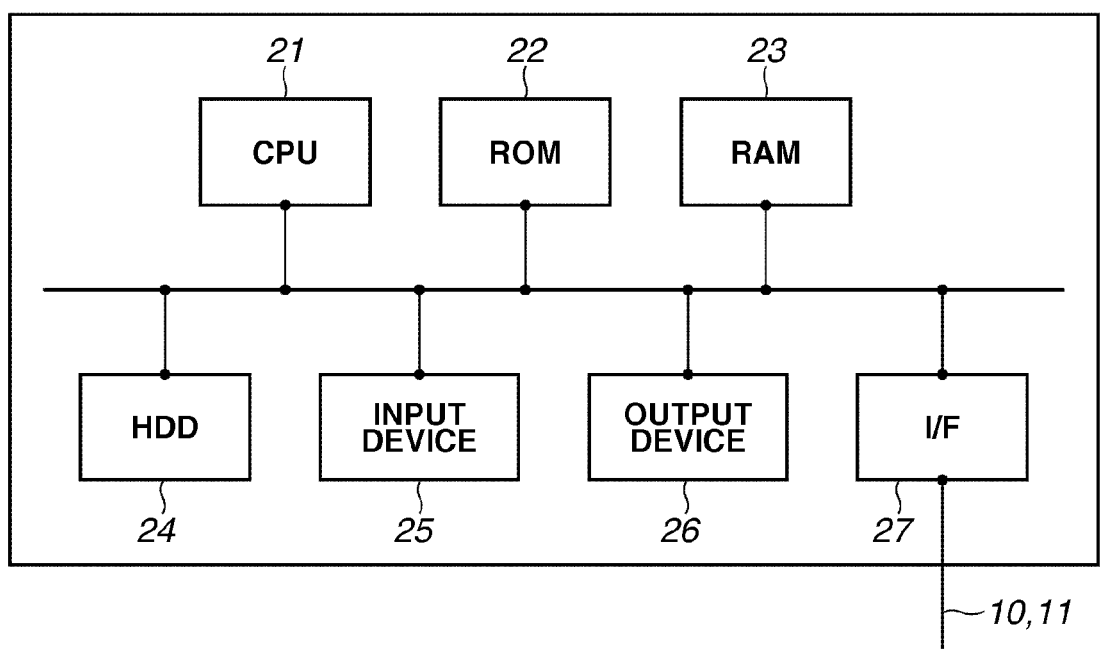
FIG. 2 illustrates a hardware configuration of each apparatus.

FIG. 2 is a block diagram illustrating a hardware configuration of the client 12, the web application server 13, the login control server 14, the database server 15, and the ID provider 16 illustrated in FIG. 1. Referring to FIG. 2, a central processing unit (CPU) 21 directly or indirectly controls each device (e.g., a read-only memory (ROM) and a random access memory (RAM) to be described below) connected by an internal bus, and executes programs for realizing the present exemplary embodiment. A ROM 22 stores a basic input/output system (BIOS). A RAM (i.e., a direct storing device) 23 is used as a work area of the CPU 21 and a temporarily storing area for loading a software module for realizing the present exemplary embodiment. An indirect storing device 24 such as the HDD and a solid state drive (SDD) stores an operating system (OS) which is basic software, and a software module. An input device 25 includes a keyboard or a pointing device (not illustrated). An output device 26 is connected to a display. An interface (I/F) 27 is used for connecting to the WAN 10 and the LAN 11, and one or more I/F are included.

When the above-described hardware is activated, the CPU 21 executes the BIOS, and the OS is loaded to be executable from the HDD 24 to the RAM 23. The CPU 21 loads various software modules to be described below from the HDD 24 to the RAM 23 according to an operation of the OS. The various software modules are executed by the CPU 21 and activates by cooperation of each of the above-described devices. Further, the I/F 27 is connected to the LAN 11, controlled by the CPU 21 according to the operation of the OS, and transmits and receives requests between the software modules stored in each server. Furthermore, the I/F 27 is connected to the WAN 10 via the LAN 11, controlled by the CPU 21 according to the operation of the OS, and realizes communication in the WWW system.

The web application server 13, the login control server 14, the database server 15, and the ID providers 16A and 16B illustrated in FIG. 1 are configured by one or a plurality of servers including the hardware configuration illustrated in FIG. 2. If the servers are configured by a plurality of servers, a load distribution configuration or a redundancy configuration can be employed using a load balancer device (not illustrated) or a software module (not illustrated).

Figure 3:
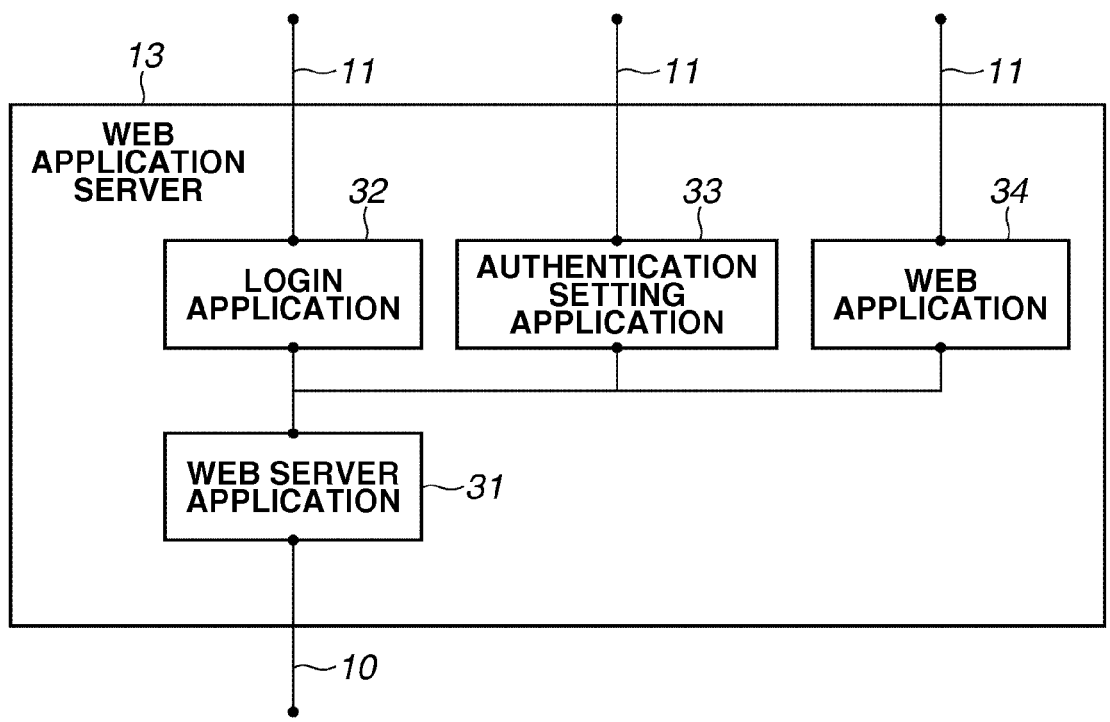
FIG. 3 illustrates a software configuration of a web application server.

FIG. 3 illustrates a configuration of the software running on the web application server 13. Each software module is stored in the HDD 24 illustrated in FIG. 2, and loaded to the RAM 23 and executed by the CPU 21 as described above, thus the software configuration in FIG. 3 can be realized.

Referring to FIG. 3, a web server application 31 includes a web interface that receives a web access request from the client 12. A login application 32 is configured on the web server application 31 as a filtering application and filters the web access request issued to an authentication setting application 33 and a web application 34. The login application 32 then communicates with a login control application programming interface (API) 41 included in the login control server 14 and verifies the user authentication. If the web access request received by the authentication setting application 33 and the web application 34 are unauthenticated, a login destination i.e., an ID provider, which performs the authentication verification is determined according to the predetermined authentication setting. The authentication setting includes the setting of the ID provider specified according to an ID provider registration instruction from the user which is a feature of the present exemplary embodiment.

The authentication setting application 33 is configured on the web server application 31 as an application, and generates an authentication setting screen with respect to the web access request received by the web server application 31.

The web application 34 is configured on the web server application 31 as an application, and returns a web access response with respect to the web access request received by the web server application 31.

Hereinbelow, a series of processes as the web application which is performed by cooperation of the above-described software modules will be regarded as a process performed by the application server 13. The web application process performed by the web application server 13 will be described in detail below.

Figure 4:
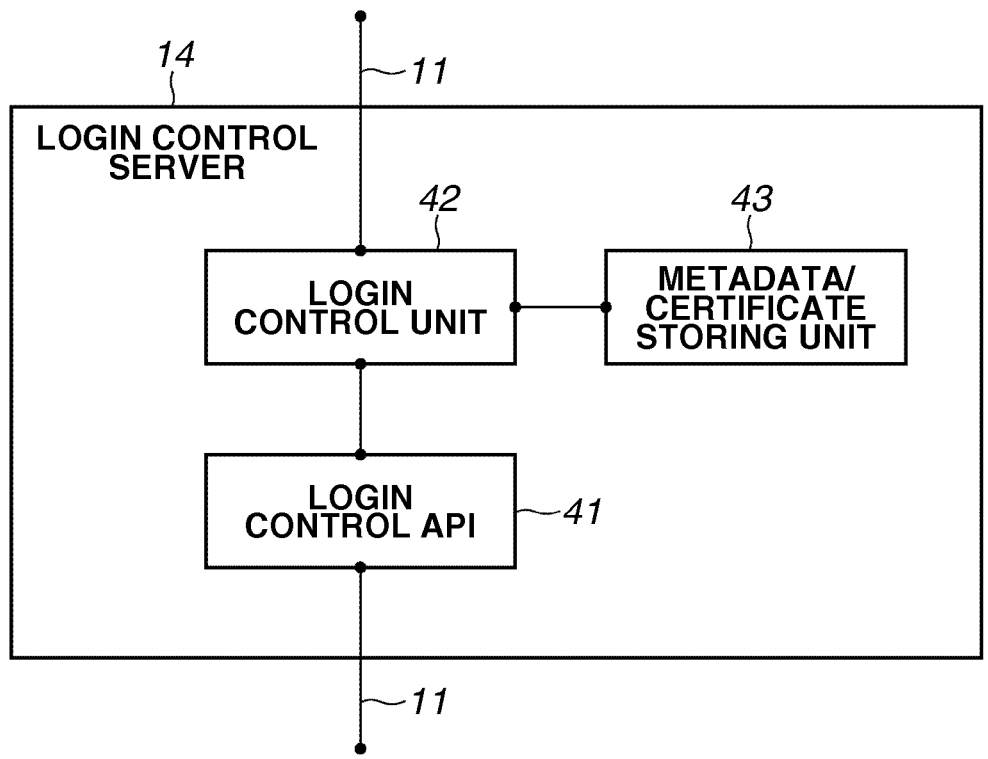
FIG. 4 illustrates a software configuration of a login control server.

FIG. 4 illustrates a configuration of the software that runs on the login control server 14. Each software module is stored in the HDD 24 illustrated in FIG. 2, and loaded to the RAM 23 and executed by the CPU 21 as described above, thus the software configuration in FIG. 4 can be realized.

Referring to FIG. 4, the login control API 41 receives an API call from the login application 32 and the authentication setting application 33 included in the web application server 13, and returns a response on the API execution result.

A login control unit 42 is an application module that receives a login control request from the login control API 41. The login control unit 42 obtains and updates data in the database server 15. Further, the login control unit 42 obtains and updates data in a metadata/certificate storing unit 43. The login control unit 42 thus performs the above-described series of control.

Hereinbelow, a series of login control processes performed by cooperation of the above-described software modules will be regarded as a process performed by the login control server 14. The login control process performed by the login control server 14 will be described in detail below.

FIG. 5 illustrates data structures of data tables managed by the database server 15 and data samples in each data table.

Referring to FIG. 5, a user table 50 stores information about a user who uses the web application server 13. The user table 50 includes the user information for verifying the user authentication information input from the user. More specifically, the user table 50 includes a user ID 501 for uniquely identifying the user, a password 502 that is secret information of the user, and a tenant ID 503 for identifying the tenant the user belongs to. Further, the user ID 501 in the user table 50 is associated with a user ID 542 in a user map table 54. Furthermore, the password 502 may be stored using a predetermined encryption algorithm or as lossy information using a hash algorithm according to the security requirements.

A tenant table 51 stores information about a tenant to which the user using the web application server 13 belongs. The tenant table 51 includes a tenant ID 511 for uniquely identifying the tenant as a main key. Further, the tenant table 51 includes a selected ID provider type 512 indicating a type of the ID provider selected by the tenant, and a selected ID provider Entity ID 513 which is the Entity ID of the ID provider selected by the tenant. The tenant ID 511 in the tenant table 51 is associated with the tenant ID 503 in the user table 50 and a tenant ID 531 in an ID provider management table 53. If authentication verification is to be performed by the login application 32 instead of an external ID provider, "login application" is stored in the selected ID provider type 512.

An ID provider master table 52 stores information about the ID provider with which a user using the web application server 13 can federate. The ID provider master table 52 includes an ID provider type 521 for identifying the type of the ID provider. Further, each ID provider type includes data 522 on whether uploading of metadata/certificate is necessary (i.e., metadata/certificate upload necessity 522), data 523 on whether the Entity ID is sharable (i.e., Entity ID sharable 523), and a shared Entity ID 524 in the case where the Entity ID is sharable. The ID provider type 521 in the ID provider master table 52 is associated with the selected ID provider type 512 in the tenant table 51, and an ID provider type 533 in the ID provider management table 53. If the ID provider type 521 of the ID provider is "login application", it indicates that the authentication verification is performed by the login application 32 instead of the external ID provider. The data is added to the ID provider master table 52 by an administrator of the service provider performing registration according to the management method of the prior information of the ID provider.

The Entity ID sharable 523 is related to the management method of the prior information in the ID provider. More specifically, if the Entity ID is "sharable", the ID provider is an information processing system that manages the prior information by being shared with the plurality of tenants. If the Entity ID is "not sharable", the ID provider is an information management system that manages the prior information for each tenant. In the former case (the Entity ID is "sharable"), the prior information becomes common prior information among all of the tenants, so that the prior information is the prior information of the information processing system. According to the present exemplary embodiment, if the multi-tenant service provider is to configure the SSO federation with such an ID provider, the service provider exceptionally shares the prior information between the tenants. It is thus desirable for the administrator of the service provider to previously register the prior information. When registering the ID provider as will be described below, the service provider registers the ID provider so that the assertion is verified using the previously stored prior information. The load on the user is thus reduced, and incorrect registration can be prevented. In the latter case (the Entity ID is "not sharable"), since the prior information is different for each tenant, it is necessary for the service provider to store the prior information of each tenant. Therefore, according to the present exemplary embodiment, the service provider stores the prior information so that the prior information is sharable among the plurality of groups, i.e., the plurality of tenants, even when it is of the multi-tenant configuration.

The ID provider management table 53 stores the information about the ID provider registered for each tenant to which the user using the web application 13 belongs. The ID provider management table 53 includes the tenant ID 531, the Entity ID 532 of the provider, the ID provider type 533, and an ID provider registration status 534. The Entity ID 532 in the ID provider management table 53 is associated with an Entity ID 541 in a user map table 54. The data is added to the ID provider management table 53 according to registration of the ID provider to be described below, and is used to determine which tenant registers which ID provider.

The user map table 54 stores information associating a user identifier with respect to the ID provider 16 with an identifier of a user using the web application server 13, when SSO is performed with the ID provider 16. The user map table 54 includes the Entity ID 541 for identifying the ID provider. Further, the user map table 54 includes the user ID 542 for identifying the user using the web application server 13 with respect to each Entity ID, and a mapping ID 543 which is the user identifier with respect to the ID provider 16. The method for using the information in each table will be described below.

FIG. 6 illustrates a metadata sample which is information for realizing SSO generated in the ID provider 16. According to the present exemplary embodiment, a sample of the information for configuring the SAML-based SSO is described as the metadata. Referring to FIG. 6, metadata 60 includes the Entity ID for uniquely identifying the ID provider, and a signature for verifying whether the metadata is valid. The signature can be verified using a certificate which is set as a pair with the metadata, and is formed by a method defined by X.509 standard, for example. Further, the metadata 60 describes a binding method indicating a protocol specification for performing the SAML-based SSO, and a formatting method for associating the user identifier for the ID provider and the user identifier for the service provider. The various types of information described in the metadata 60 are sample information pieces, and are not a limit on description content of the metadata defined by SAML.

The SAML trust relationship is established by obtaining the file in which the metadata is written and the file of the certificate used for signing from the ID provider 16, and setting the files in the service provider. AS a method for obtaining the metadata and the certificate from the ID provider 16, the ID provider 16 may generates a screen (not illustrated) for downloading these files, and the client 12 can obtain them by accessing the screen.

The process performed in each server according to the present exemplary embodiment will be described below with reference to a sequence diagram and flowcharts.

FIG. 7 is a SSO sequence diagram illustrating a case where a web access request is issued from the web browser in the client 12 to the web application 34 in the web application server 13. Hereinbelow, control performed on the web browser in the client 12 will be described as control in the client 12. Further, the SSO sequence is an example of a SSO protocol sequence defined in SAML, and does not limit the SSO protocol sequence method defined in SAML. It is assumed that the registration and selection of the ID provider to be described below are previously performed in the SSO protocol sequence.

In sequence S7.1, the client 12 issues a web access request to the web application server 13. An access destination of the web access request indicates the web application 34, and a cookie indicating that the authentication to be described below has been completed is not included in the request.

In sequence S7.2, the login application 32 filters the request, and requests the login control API 41 in the login control server 14 to perform authentication confirmation.

The login control unit 42 in the login control server 14 processes the authentication confirmation request received by the login control API 41. In sequence S7.3, since the authentication confirmation request does not include the information indicating that the authentication has been performed as will be described below, the login control server 14 redirects the client 12 to the login application 32.

In sequence S7.4, the login application 32 in the web application server 13 receives an access from the client 12, and responds by displaying a tenant ID input screen (not illustrated). In sequence S7.5, the client 12 notifies the login application 32 of the tenant ID input to the tenant ID input screen.

In sequence S7.6, the web application server 13 obtains from the login control API 41, login destination information using the tenant ID received by the login application 32. The login control unit 42 in the login control server 14 then processes the login destination information obtaining request received by the login control API 41. In sequence S7.7, the login control server 14 uses the received tenant ID and obtains the selected ID provider information from the tenant table 51 managed by the database server 15.

In sequence S7.8, the database server 15 extracts from the received tenant ID, the selected ID provider type 512 and the Entity ID 513 of the selected ID provider, and responds to the login control server 14. In such a case that the selected ID provider 512 is "login application", the login control server 14 responds to the web application server 13 to instruct the login application 32 to perform authentication verification. The login application 32 receiving the authentication verification request displays to the client 12 a user authentication screen (not illustrated). The login application 32 then receives the user ID and the password input from the client 12, and issues to the login control server 14 an authentication verification request using the input information. Upon receiving the authentication verification request, the login control server 14 verifies, via the database server 15, whether the user ID 501 and the password 502 in the user table 50 match the user ID and the password, i.e., the obtained user authentication information. If the user IDs and the passwords match, the login control server 14 may perform the process in sequence S7.16.

Returning to the main flow, in sequence S7.9, the login control unit 42 in the login control server 14 processes the received Entity ID. The login control server 14 obtains an endpoint of the ID provider 16 for performing SSO from the metadata/certificate storing unit 43 using the Entity ID. In sequence S7.10, the login control server 14 issues via the client 12 a SAML assertion request with respect to the endpoint of the ID provider 16. The SAML assertion request is issued via the web application server 13. The assertion request may be signed using the certificate which has been previously set. According to the present exemplary embodiment, there is no signature on the assertion request.

In sequence S7.11, upon receiving the assertion request, the ID provider requests the client 12 to perform user authentication. As for the user authentication method, the user may be authenticated using the user identifier and the secret information managed by the ID provider 16. More specifically, form authentication in which a screen is displayed on the web browser of the client 12 for receiving input of the user identifier and the secret information, or basic authentication, may be performed.

If the user authentication is successful, the ID provider 16 generates the assertion. In sequence S7.12, the ID provider 16 returns an assertion response. The assertion generated by the ID provider 16 includes the Entity ID, the signature by the certificate, and the mapping ID of the ID provider 16.

The login control unit 42 in the login control server 14 then processes the received assertion. In sequence S7.13, the login control server 14 obtains the certificate from the metadata/certificate storing unit 43 using the Entity ID. The login control server 14 then verifies using the obtained certificate, the signature of the assertion included in the assertion response received from the ID provider 16. In such a case, the login control server 14 may verify the validity of the Entity ID included in the assertion response using the metadata. However, the assertion verification generally refers to verification using only the signature.

If the signature of the assertion is correct, the process proceeds to sequence S7.14. In sequence S7.14, the login control server 14 obtains from the user map table 54 in the database server 15, the user ID using the Entity ID and the mapping ID. In sequence S7.15, the database server 15 returns the user ID identified by the Entity ID and the mapping ID. In such a case, the method for referring to the mapping ID may be determined based on the metadata. Whether the ID provider or the service provider is to identify the user ID from the mapping ID is written in the metadata. According to the present exemplary embodiment, the service provider identifies the user ID.

The login control unit 42 in the login control server 14 then processes the received user ID. In sequence S7.16, the login control server 14 generates authentication information. The authentication information to be generated here is information, for example, indicating that the user is authenticated, including a session ID for uniquely identifying the authentication session. The authentication information is stored in association with the session ID and the user ID, in the RAM 23 of the login control server 14. In sequence S7.17, the login control server 14 redirects the client 12 via the web application server 13 to the web access request destination received in sequence S7.1. In such a case, the generated session ID of the authentication information is set to the cookie in the HTTP protocol in the redirect request.

In sequence S7.18, the login application 32 in the web application server 13 filters the request, and requests the login control API 41 in the login control server 14 to perform the authentication confirmation. In such a case, the web application server 13 transmits to the login control API 41 the session ID of the authentication information set to the cookie transmitted from the web browser in the client 12.

The login control unit 42 in the login control server 14 then processes the authentication confirmation request received by the login control API 41. More specifically, the login control unit 42 verifies whether the session ID of the received authentication information is stored as the authentication information in the RAM 23 in the login control server 14, and determines whether the user has been authenticated. In sequence S7.19, the login control server 14 notifies the login application 32 of the verification result and the authentication information in the case where the user has been authenticated. The login application 32 then notifies the web application 34 of the web access request. In such a case, the login application 32 obtains via the login control server 14 and notifies of the user ID 501 and the tenant ID 503 in the user table 50 in the database server 15 using the user ID stored in the authentication information.

The web application 34 in the web application server 13 then processes the web access request. In sequence S7.21, the web application server 13 issues the web access response to the client 12. As a result, the client 12 can receive the service provided by the service provider by only inputting the user authentication information to the ID provider without inputting the user authentication information to the information processing system of the service provider. Accordingly, the SAML-based SSO can be realized by the above-described sequence.

A method for registering the ID provider will be described below with reference to the drawings. More specifically, the method for registering the metadata and the certificate in the metadata/certificate storing unit 43 used in sequence S7.9 and sequence S7.13 illustrated in FIG. 7 will be described below. Further, the method for registering the Entity ID information of the selected ID provider in the tenant table 51 used in sequence S7.7 and sequence S7.8 illustrated in FIG. 7 will be described below. It is assumed that the user table 50, the tenant ID 511 in the tenant table 51, and the information of the user map table 54 are previously prepared.

Figure 8:
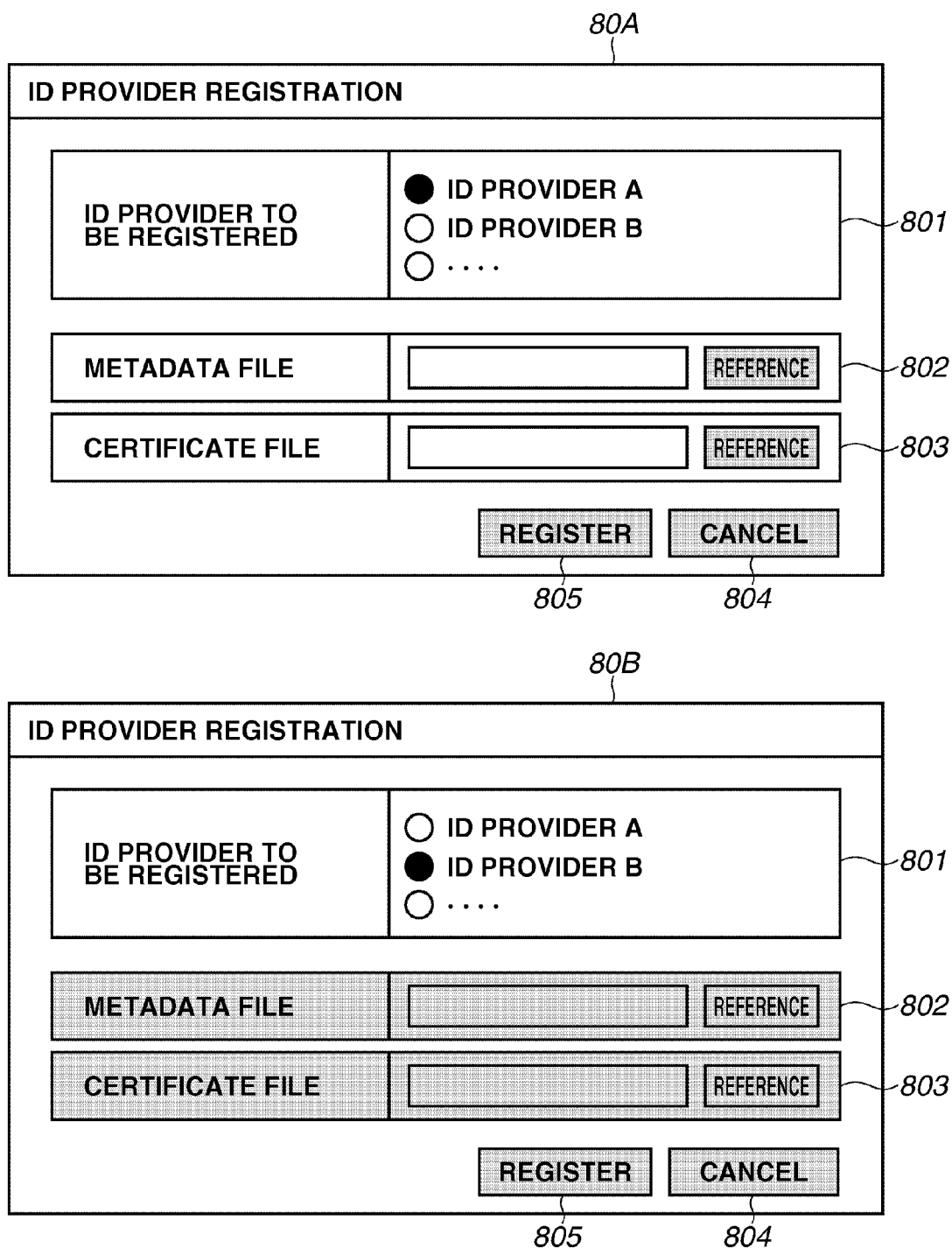
FIG. 8 illustrates ID provider registration screens.

FIG. 8 illustrates an ID provider registration screen generated by the authentication setting application 33 in the web application server 13. The authentication setting application 33 displays the screen in response to the web access request from the client 12. The ID provider that is registered by performing the registration thereof can be an object to be selected as the ID provider to be described below using FIG. 10. If the access from the user is not authenticated when the ID provider is to be registered, the user authentication process described in FIG. 7 is performed by the login application 32 executing filtering. The authentication setting application 33 then receives from the login application 32 the authenticated user authentication information. The user authentication information includes the user ID 501 and the tenant ID 503 in the user table 50. Upon receiving the user authentication information, the authentication setting application 33 displays the ID provider registration screen in response. The client 12 then displays a screen 80A or a screen 80B according to a selected state of items.

Referring to FIG. 8, an ID provider list 801 is used for selecting the ID provider to be registered. The authentication setting application 33 obtains the information from the ID provider master table 52 in the database server 15 via the login control server 14, and generates the ID provider list 801. In such a case, the authentication setting application 33 omits the information in which the ID provider type 521 is "login application".

A file selection control box 802 is used for designating a metadata file to be registered. A file selection control box 803 is used for designating a certificate file to be registered. The file selection control boxes 802 and 803 are controlled as described below each time the selected state of the ID provider changes in the ID provider list 801. If the metadata/certificate upload necessity 522 in the ID provider master table 52 of the ID provider selected in the ID provider list 801 is "YES", the file selection control boxes 802 and 803 are displayed in valid states as illustrated in the screen 80A. The user can thus designate the prior information to be stored in the service provider. If the metadata/certificate upload necessity 522 in the ID provider master table 52 of the ID provider selected in the ID provider list 801 is "NO", the file selection control boxes 802 and 803 are displayed in invalid states as illustrated in the screen 80B. The user thus cannot designate the prior information to be stored in the service provider. The screen is configured to disallow uploading of prior information as described above, so that the issue occurring when the trust relationship with the ID provider is dynamically changed can be solved.

A cancel button 804 is used for ending the operation without registering the ID provider. A registration button 805 is used for registering the ID provider. If the user presses the registration button 805, the authentication setting application 33 performs the following processes. The authentication setting application 33 obtains the ID provider type selected in the ID provider list, using the information obtained from the ID provider master table 52 in the database server 15 when the ID provider list is generated. If the file selection boxes 802 and 803 are valid, the authentication setting application 33 obtains the metadata file and the certificate file, respectively. The authentication setting application 33 then performs the following processes with respect to each of the metadata and certificate files.

The authentication setting application 33 verifies the signature written in the metadata using the certificate. If the verification result is "invalid", the authentication setting application 33 displays an error screen (not illustrated) to the client 12 in response and ends the process. If the verification result is "valid", the authentication setting application 33 extracts the Entity ID from the metadata. The authentication setting application 33 then issues to the login control server 14 an ID provider registration request, using the user information, the ID provider type, the metadata, the certificate, and the extracted Entity ID. The login control unit 42 in the login control server 14 processes the ID provider registration request received via the login control API 41. The process flow will be described below.

As described above, the authentication setting application 33 verifies the signature in the metadata. However, the signature may be verified when the login control server 14 registers the metadata and the certificate as will be described below. Further, when the authentication setting application 33 issues the ID provider registration request to the login control server 14, the authentication setting application 33 may transmit each of the actual metadata and certificate files as the data. Furthermore, the authentication setting application 33 may store the files in a file storage area (not illustrated) and transmit IDs for identifying the files to the login control server 14. The IDs for identifying the files may be assigned to file names.

Figure 9A:
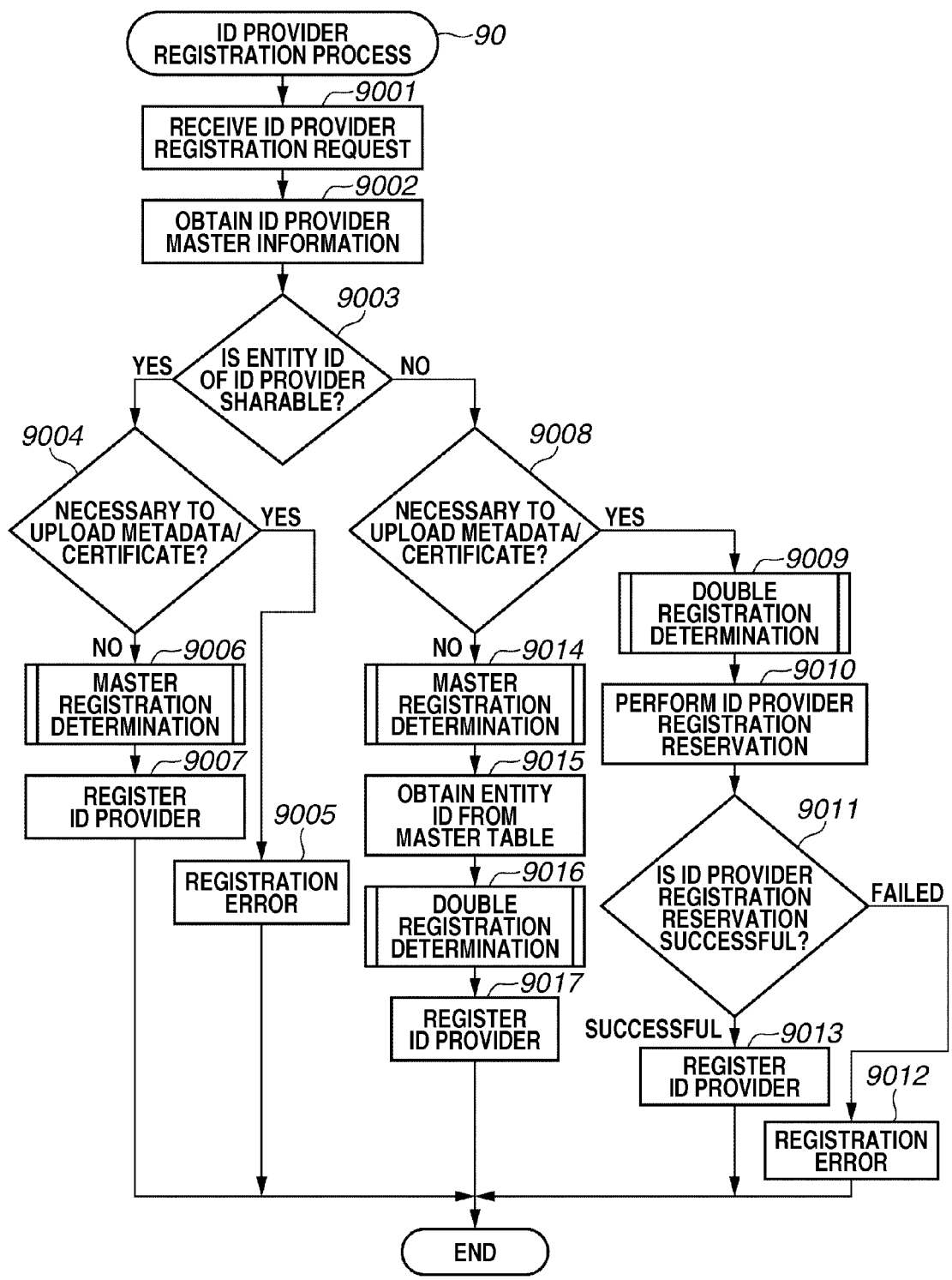

FIGS. 9A and 9B are flowcharts illustrating an ID provider registration process performed in the case where the login server 14 receives the ID provider registration request from the authentication setting application 33. The registration request is issued according to an instruction from the user to register the ID provider. The flowchart includes an ID provider registration process flow 90, a master registration determination process flow 91 which is a common process flow among the flows, and a double registration determination process flow 92.

The ID provider registration process flow 90 performed by the login control unit 42 will be described below. In step 9001, the login control unit 42 receives from the authentication setting application 33 the ID provider registration request. The login control unit 42 receives as the ID provider registration request, the user information and the ID provider type, and the metadata, the certificate, and the Entity ID of the metadata as necessary.

In step 9002, the login control unit 42 uses the received ID provider type and obtains the information about the ID provider from the ID provider master table 52 in the database server 15.

In step 9003, the login control unit 42 refers to the Entity ID sharable 523 in the obtained ID provider information. If the Entity ID is sharable (YES in step 9003), the process proceeds to step 9004. If the Entity ID is not sharable (NO in step 9003), the process proceeds to step 9008. In other words, the login control unit 42 determines whether the information processing system, i.e., the ID provider designated by the user to be registered, manages the prior information for each group or manages the prior information by being shared with a plurality of groups.

In step 9004, the login control unit 42 refers to the metadata/certificate upload necessity 522 in the obtained ID provider information. If upload is necessary (YES in step 9004), the process proceeds to step 9005, and if upload is unnecessary (NO in step 9004), the process proceeds to step 9006.

In step 9005, the login control unit 42 returns a registration error response with respect to the received ID provider registration request, and the process ends. In the case of an information processing system which requires receiving the prior information even though the ID provider manages the prior information by causing the plurality of groups to share the prior information, there is a high risk of the ID provider incorrectly realizing the SSO. It is thus unlikely for such an ID provider to actually perform the operation. Therefore, according to the present exemplary embodiment, such a case is determined as a setting error in the ID provider master table 52, and is set in the service provider as an error in exceptional processing. In other words, if the ID provider manages the prior information by causing a plurality of groups to share the prior information, it is necessary for the prior information to be previously stored.

In step 9006, the login control unit 42 uses the ID provider type received in step 9001 and performs the master registration determination process to be described below. If the master registration determination process is normally performed, the process proceeds to step 9007.

In step 9007, the login control unit 42 registers the ID provider. More specifically, the login control unit 42 registers in the ID provider management table 53 in the database server 15, the tenant ID included in the user information, the shared Entity ID 524 in the ID provider master table 52, the ID provider type, and an ID provider status. In such a case, the ID provider status is stored as "registered". If the ID provider status becomes "registered", the user becomes capable of registering the ID provider via an ID provider registration screen illustrated in FIG. 10 to be described below.

In step 9008, the login control unit 42 refers to the metadata/certificate upload necessity 522 in the obtained ID provider information. If upload is necessary (YES in step 9008), the process proceeds to step 9009, and if upload is unnecessary (NO in step 9008), the process proceeds to step 9014.

In step 9009, the login control unit 42 performs using the Entity ID received in step 9001, the double registration determination process to be described below. If the double registration determination process is normally performed, the process proceeds to step 9010.

In step 9010, the login control unit 42 performs ID provider registration reservation. More specifically, the login control unit 42 registers in the ID provider management table 53 in the database server 15, the tenant ID, the Entity ID, the ID provider type, and the ID provider status included in the user information. In such a case, the ID provider status is stored as "registration reservation". If the metadata and certificate files are to be directly received, the files are stored in a memory area (not illustrated), and information pieces for identifying the metadata and the certificate are added to the ID provider status 534 and stored.

In step 9011, the login control unit 42 determines whether the ID provider registration reservation is successful. If the reservation has failed (FAILED in step 9011), the process proceeds to step 9012. If the reservation is successful (SUCCESSFUL in step 9011), the process proceeds to step 9013. As for a reason for failure in the registration reservation, for example, when a plurality of users performs at the same time the ID provider registration reservation with respect to the Entity ID, the results of the double registration determination in step 9009 may mutually become normal. This because verification of the prior information takes time, and the prior information is not yet stored as the prior information corresponding to the other groups of the registered user. In such a case, unique constraints may be set to a combination of the items in the ID provider management table 53 in the database server 15 or a different item (not illustrated). By specifying such a setting, the failure response can be issued from the side which subsequently executes a commitment in a database transaction.

In step 9012, the login control unit 42 returns a registration error response with respect to the received ID provider registration request, and the process ends.

In step 9013, the login control unit 42 registers the ID provider on which the registration reservation has been performed. The registration of the ID provider in the "registration reservation" status, performed by the login control unit 42, will be described below.

It is necessary for the login control unit 42 to determine whether the login application 32 and the login control unit 42 are capable of interpreting and executing the various protocol settings of SAML written in the metadata. Further, it is necessary for the login control unit 42 to determine whether the description in the metadata satisfies the requirements of the SAML, and whether the certificate is secure. Such determination processes are referred to as verification of the metadata/certificate. It is highly likely that the verification of the metadata/certificate requires a certain period of time. According to the present exemplary embodiment, the login control unit 42 thus regularly performs registration of the ID provider in the "registration reservation" status, separately from performing the ID provider registration process flow 90. However, according to the present exemplary embodiment, the configuration is for a case where time is required for registering the metadata/certificate, and registration time may be shortened according to a support range of the description content of the metadata and the method for verifying the content, and may also be performed as step 9013. The registration process performed as a separate process or as step 9013 will be described below.

In step 9013 or in a separate process, the login control unit 42 registers the ID provider in the "registration reservation" status. More specifically, if the verification result of the metadata and certificate files is "valid", the login control unit 42 performs the following process. The login control unit 42 stores the metadata and the certificate in the metadata/certificate storing unit 43 using the Entity ID. The login control unit 42 then changes the ID provider status to "registered" in the ID provider management table 53 in the database server 15, and ends the process. If the verification result of the metadata and certificate files is "invalid", the login control unit 42 ends the process as a registration error.

In step 9014, the login control unit 42 uses the ID provider type received in step 9001 and performs the master registration determination process to be described below. If the master registration determination is normally performed, the process proceeds to step 9015. If the ID provider is an information processing system which manages the prior information for each group, and the prior information has been previously stored, the process in step 9014 and thereafter are performed. Since the system is used in a business application, the system applies to the case where the prior information is previously obtained from an administrator of the tenants. A system administrator of the service provider thus stores the prior information before the administrator of the tenants performs registration. Therefore, the load on the tenant administrator in registering the ID providers can be reduced.

In step 9015, the login control unit 42 obtains the shared Entity ID 524 from the ID provider master table 52.

In step 9016, the login control unit 42 uses the Entity ID obtained in step 9015 and performs the double registration determination process to be described below. If the double registration determination process is normally performed, the process proceeds to step 9017.

In step 9017, the login control unit 42 registers the ID provider. More specifically, the login control unit 42 registers in the ID provider management table 53 in the database server 15, the tenant ID included in the user information, the shared Entity ID 524 in the ID provider master table 52, the ID provider type, and the ID provider status. In such a case, the ID provider status is stored as "registered".

The master registration determination flow 91 performed by the login control unit 42 will be described below. In step 9101, the login control unit 42 receives the ID provider type to be determined.

In step 9102, the login control unit 42 determines using the ID provider type, whether the Entity ID is registered in the shared Entity ID 524 in the ID provider master table 52. If the Entity ID is not registered (NO in step 9102), the process proceeds to step 9103, and if the Entity ID is registered (YES in step 9102), the process proceeds to step 9104. In step 9103, the login control unit 42 issues an error response, and end the process. In step 9104, the login control unit 42 issues a normal response.

The double registration determination flow 92 performed by the login control unit 42 will be described below. In step 9201, the login control unit 42 receives the Entity ID to be determined.

In step 9202, the login control unit 42 determines, using the Entity ID, whether there is an ID provider having the same Entity ID in the ID provider management table 53. In such a case, the login control unit 42 regards the ID provider of which ID provider status 534 is "registered" or "registration reservation" as a determination target. If there is an ID provider having the same Entity ID (YES in step 9202), the process proceeds to step 9203, and if there is no ID provider having the same Entity ID (NO in step 9202), the process proceeds to step 9204. In step 9203, the login control unit 42 issues an error response, and ends the process. In step 9204, the login control unit 42 issues a normal response.

By performing the above-described processes, the service provider of a multi-tenant configuration can establish the trust relationship with the ID provider for each tenant. In other words, if the service provider is to establish the trust relationship with the ID provider and the ID provider has only a single Entity ID, the plurality of tenants in the service provider can share the single ID provider. Further, if the ID provider can have a plurality of Entity IDs, the trust relationship can be dynamically established without sharing the ID provider of the same Entity ID with the plurality of tenants in the service provider. Furthermore, the load on the user in registering the ID provider can be reduced, and incorrect setting of the ID provider can be prevented.

Figure 10:
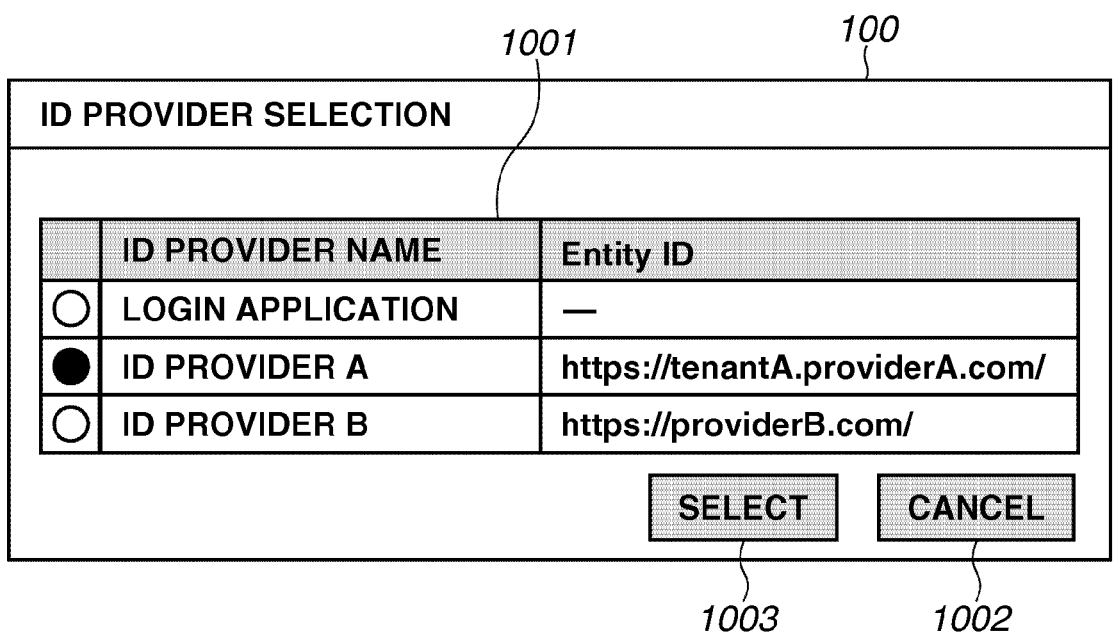
FIG. 10 illustrates an ID provider selection screen.

FIG. 10 illustrates the ID provider selection screen generated by the authentication setting application 33 in the web application server 13. The authentication setting application 33 generates the screen in response to the web access request received from the client 12. The ID providers that can be selected on the selection screen in which a list of ID providers is displayed have been registered according to the process described with reference to FIG. 8. The ID provider selected as will be described below becomes the ID provider which performs the authentication verification in the SSO protocol flow described with reference to FIG. 7. In other words, the user can select the ID provider by him/herself, and can be authenticated by an arbitrary ID provider. Only the ID providers that have been registered are the selectable ID providers are.

If an access from the client 12 has not been authenticated, the log in application 32 performs the user authentication by performing filtering as described with reference to FIG. 7. The authentication setting application 33 then receives the user authentication information from the login application 32. The user authentication information is the user ID 501 and the tenant ID 503 in the user table 50. Upon receiving the user authentication information, the authentication setting application 33 displays the ID provider selection screen in response, and the client 12 displays the ID provider selection screen 100.

Referring to FIG. 10, an ID provider list 1001 is used for selecting from the list of registered ID providers, the ID provider to perform SAML-based user authentication. The ID provider list 1001 displays items including information indicating the selected state, the ID provider name, and the corresponding Entity ID. The authentication setting application 33 obtains the information from the ID provider management table 53 in the database server 15 via the login control server 14, and generates the ID provider list 1001. In such a case, the authentication setting application 33 narrows down the information about the ID provider to be obtained using the tenant ID of the obtained user information. Further, the authentication setting application 33 displays the login application 32 to be selectable as the ID provider with respect to all tenants. The authentication setting application 33 then obtains the selected ID provider type 512 using the tenant ID from the tenant table 51 in the database server 15, and displays the corresponding ID provider in the ID provider list 1001 as in the selected state. A cancel button 1002 is used for ending the process without selecting the ID provider. A select button 1003 is used for implementing the selection of the ID provider.

If the user presses the select button 1003, the authentication setting application 33 performs the following processes. First, the authentication setting application 33 obtains the Entity ID of the ID provider selected in the ID provider list 1001 using the information obtained from the ID provider management table 53 in the database server 15 when the ID provider list 1001 is generated. The authentication setting application 33 then issues an ID provider selection request to the login control server 14 using the user information, the Entity ID, and the ID provider type. The login control unit 42 in the login control server 14 processes the ID provider selection request received via the login control API 41.

If a result of the ID provider selection request is an error, the authentication setting application 33 responds by displaying an error screen (not illustrated). If a result of the ID provider selection request is successful, the authentication setting application 33 responds by displaying the ID provider selection screen 100 in which the selected state of the ID provider list 1001 is updated.

Upon receiving the ID provider selection request, the login control unit 42 confirms, using the tenant ID and the Entity ID, whether the Entity ID is registered in the ID provider management table 53 in the database server 15. If the Entity ID is not registered, the login control unit 42 issues an error response. If the Entity ID is registered, the login control unit 42 updates the information about the selected ID provider type 512 and the selected ID provider Entity ID 513 of the information of the matching tenant ID in the tenant table 51 in the database server 15, and responds that the result is successful. Then, the ID provider with respect to the specific tenant thus becomes the ID provider selected by the user belonging to the specific tenant, and if an unauthenticated access is received from the client, the client is caused to access the ID provider.

By performing the above-described process, the ID provider registered by performing the processes in the flow illustrated in FIGS. 9A and 9B can be set to be used in the SSO sequence described with reference to FIG. 7. It is assumed that the registration and the selection of the ID provider are performed by the administrator who represents each tenant. Therefore, the user belonging to the tenant in the ID provider that has been registered and selected by the administrator inputs the tenant ID in sequence S7.5, so that the ID provider to perform user authentication is automatically determined. The authorization information issued in response to successfully authenticating the user belonging to the tenant is also verified using the prior information set by the administrator belonging to the tenant.

As described above with reference to the ID provider registration flow 90 illustrated in FIG. 9A, it is highly likely that the verification of the metadata and the certificate requires time. Therefore, if the ID provider is registered on the ID provider registration screen 80A or 80B using the incorrect metadata and certificate files, the ID provider status becomes "registration reservation" in step 9010 illustrated in FIG. 10. Accordingly, it is determined in the double registration determination flow 92 that the Entity ID is being used, and re-registration cannot be performed even if the user urgently attempts to re-register the correct metadata and certificate. In other words, the correct metadata and certificate files can only be set by waiting for the verification of the previous metadata and certificate to be completed, and the process result to become an error.

Figure 11:
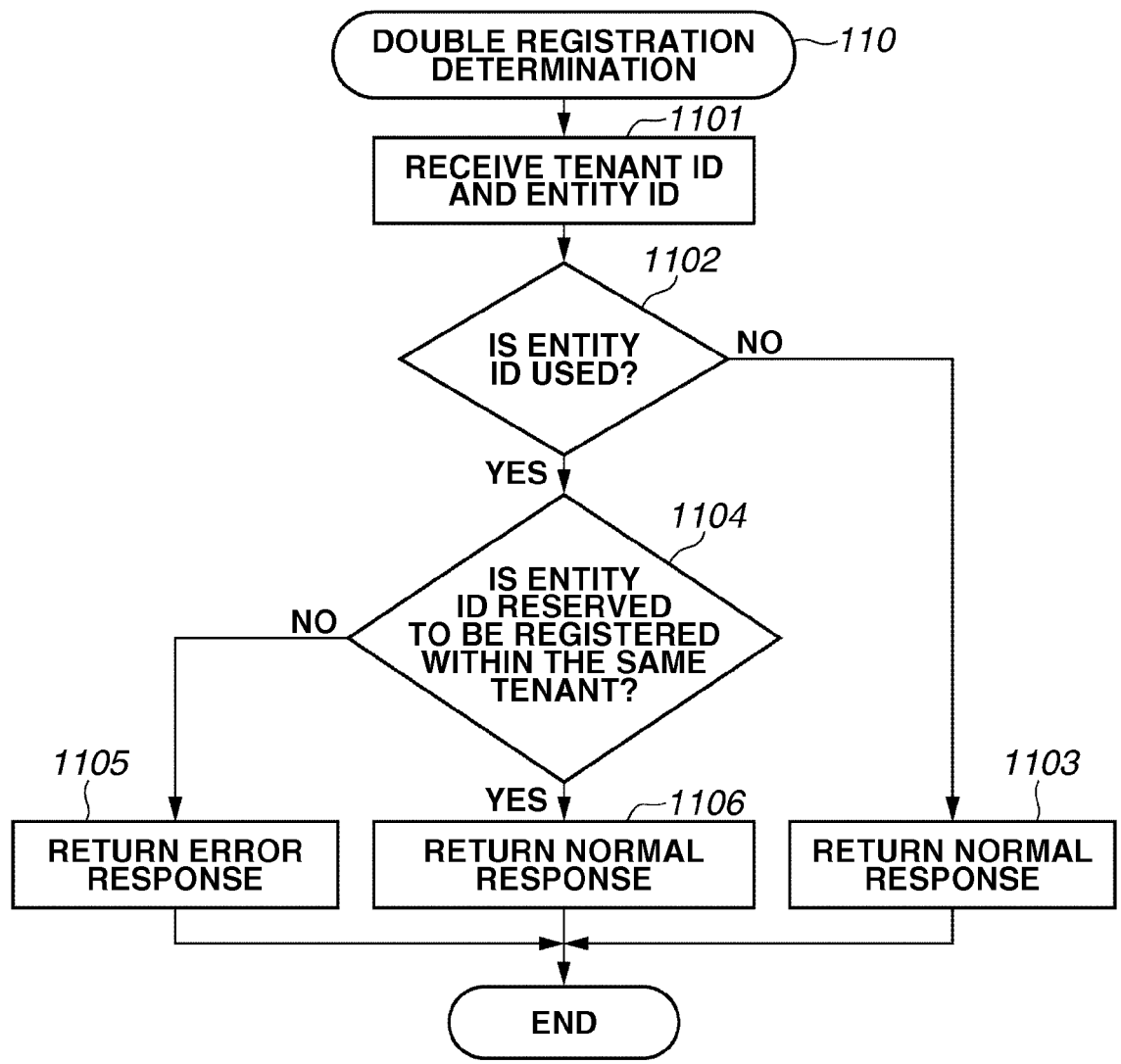
FIG. 11 is a flowchart illustrating double registration determination.

According to a second exemplary embodiment, such a problem is solved as will be described below with reference to the drawings. Since the second exemplary embodiment is different from the first exemplary embodiment only in the double registration determination flow 92, description will be omitted. FIG. 11 is a flowchart illustrating the process performed when the login control unit 42 in the login control server 14 receives a double registration determination request according to the second exemplary embodiment. According to the first exemplary embodiment, whether the prior information uploaded from the user is previously registered as the prior information corresponding to other groups is determined based on the Entity ID. According to the second exemplary embodiment, another determination process is added as illustrated in FIG. 11.

A double registration determination flow 110 performed by the login control unit 42 will be described below with reference to FIG. 11. In step 1101, the login control unit 42 receives the Entity ID to be determined and the tenant ID included in the user information.

In step 1102, the login control unit 42 determines, using the Entity ID, whether the ID provider having the same Entity ID exists in the ID provider management table 53. In such a case, the login control unit 42 regards the ID provider of which ID provider status 534 is "registered" or "registration reservation" as a determination target. If the ID provider having the same Entity ID exists, the login control unit 42 determines that the Entity ID is being used (YES in step 1102), and the process proceeds to step 1104. If the ID provider having the same Entity ID does not exist, the login control unit 42 determines that the Entity ID is not used, (NO in step 1102), the process proceeds to step 1103.

In step 1103, the login control unit 42 issues a normal response.

In step 1104, the login control unit 42 determines whether the tenant ID 531 of the same Entity ID determined in step 1102 is the same as the obtained tenant ID. If the tenant ID 531 is the same, the login control unit 42 determines whether the ID provider status 534 is "registration reservation". If the ID provider status 534 is not "registration reservation" (NO in step 1104), the process proceeds to step 1105. If the ID provider status 534 is "registration reservation" (YES in step 1104), the process proceeds to step 1106.

In step 1105, the login control unit 42 issues an error response and ends the process. In step 1106, the login control unit 42 issues a normal response and ends the process.

According to the second exemplary embodiment, if the ID provider is registered using the incorrect metadata and certificate files, re-registration can be performed within the same tenant even when the "registration reservation" has been set in step 9010. In other words, the correct metadata and certificate files can be reset without waiting for completion of the verification of the metadata and the certificate, so that usability can be improved.

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-116625, filed May 22, 2012, hereby incorporated by reference herein in its entirety.

What is claimed is:

1. A second information processing system that communicates with a plurality of first information processing systems that perform user authentication using user authentication information input by a user, the second information processing system comprising:

one or more processors; and one or more computer-readable media storing instructions that, when executed by the one or more processors, cause the one or more processors to perform operations comprising:

verifying, using prior information, whether authorization information issued by the plurality of first information processing systems in response to successfully authenticating a user satisfies security requirements;

providing, in a case where the authorization information is verified as satisfying the security requirements, a service without performing the user authentication; and performing, in a case where an instruction to register a first information processing system that performs user authentication from among the plurality of first information processing systems is received from the user, after whether the prior information is shared in a plurality of groups in the first information processing system is determined, the registration of the first information processing system by a method that differs between a case in which the prior information is shared in a plurality of groups and a case in which the prior information is not shared in a plurality of groups.

2. The second information processing system according to claim 1, wherein, in a case where the first information processing system causes a plurality of groups to share the prior information, performing the registration comprises performing registration so that verification is performed using prior information that has been previously stored, without receiving prior information from the user.

3. The second information processing system according to claim 2, wherein, in a case where the first information processing system manages the prior information for each group, performing the registration comprises receiving prior information corresponding to a group to which the user belongs and performing registration so that verification is performed using the received prior information.

4. The second information processing system according to claim 3, wherein, in a case where the prior information corresponding to a group to which the user belongs is received, and the received prior information is previously stored as prior information corresponding to another group, or the received prior information is not previously stored as prior information corresponding to the another group but is being verified prior information to store as prior information corresponding to the another group, the registration is not performed according to an instruction from the user.

5. The second information processing system according to claim 3, wherein verification using the received prior information is also performed on authentication information to be issued by the first information processing system in response to successfully authenticating a different user belonging to the same group as the user.

6. The second information processing system according to claim 2, wherein, in a case where the first information processing system manages the prior information for each group and the prior information corresponding to a group to which the user belongs is previously provided as prior information corresponding to the group, performing the registration comprises performing registration so that verification is performed using the prior information that has been previously provided without receiving from the user the prior information corresponding to the group to which the user belongs.

7. The second information processing system according to claim 2, wherein the second information processing system is an information processing system of a multi-tenant configuration that manages data for each group, and manages the previously stored prior information as data that is shared between groups as an exception.

8. The second information processing system according to claim 1, wherein the second information processing system transmits to a client operated by a user a screen for registering a first information processing system that performs user authentication, wherein the screen does not allow, in a case where a user selects a first information processing system that does not require receiving the prior information, designation of the prior information to be stored, and allows, in a case where a user selects a first information processing system that requires receiving the prior information, designation of the prior information to be stored.

9. The second information processing system according to claim 1, wherein the prior information includes at least a certificate for verifying a signature issued by the first information processing system along with the authorization information.

10. The second information processing system according to claim 1,
wherein the second information processing system transmits to a client operated by a user a list of first processing systems registered according to an instruction from a user, and
wherein the second information processing system sets a first information processing system selected from the list as a first information processing system to perform user authentication, and, in a case where there is an unauthenticated access from the user, causes the client to access the set first information processing system so as to make the set first information processing system perform user authentication.

11. The second information processing system according to claim 1, wherein, in a case where an instruction to register a first information processing system that performs user authentication is received from the user, performing the registration comprises performing registration using either method that the verification is performed using the prior information that has been previously stored according to a management method of the prior information in the first information processing system, or that the verification is performed by receiving the prior information corresponding to a group to which the user belongs and using the received prior information.

12. A method for performing control in a second information processing system that communicates with a plurality of first information processing systems that perform user authentication using user authentication information input by a user, the method comprising:
verifying, using prior information, whether authorization information issued by the plurality of first information processing systems in response to successfully authenticating a user satisfies security requirements;
providing, in a case where the authorization information is verified as satisfying the security requirements, a service without performing the user authentication; and
performing, in a case where an instruction to register a first information processing system that performs user authentication from among the plurality of first information processing systems is received from the user, after whether the prior information is shared in a plurality of groups in the first information processing system is determined, the registration of the first information processing system by a method that differs between a case in which the prior information is shared in a plurality of groups and a case in which the prior information is not shared in a plurality of groups.

13. A computer-readable storage medium storing a program for causing a computer to perform a program to be executed in a second information processing system that communicates with a plurality of first information processing systems that perform user authentication using user authentication information input by a user, the program comprising:
verifying, using prior information, whether authorization information issued by the plurality of first information processing systems in response to successfully authenticating a user satisfies security requirements;
providing, in a case where the authorization information is verified as satisfying the security requirements, a service without performing the user authentication; and
performing, in a case where an instruction to register a first information processing system that performs user authentication from among the plurality of first information processing systems is received from the user, after whether the prior information is shared in a plurality of groups in the first information processing system is determined, the registration of the first information processing system by a method that differs between a case in which the prior information is shared in a plurality of groups.

* * * * *